US012639223B2

(12) United States Patent
Kaviani et al.

(10) Patent No.: US 12,639,223 B2
(45) Date of Patent: May 26, 2026

(54) EMBEDDED CONFIGURABLE ENGINE

(71) Applicant: XILINX, INC., San Jose, CA (US)

(72) Inventors: Alireza Kaviani, San Jose, CA (US);
Pongstorn Maidee, San Jose, CA (US);
Ivo Bolsens, San Jose, CA (US)

(73) Assignee: XILINX, INC., San Jose, CA (US)

( * ) Notice: Subject to any disclaimer, the term of this
patent is extended or adjusted under 35
U.S.C. 154(b) by 89 days.

(21) Appl. No.: 18/443,756

(22) Filed: Feb. 16, 2024

(65) Prior Publication Data

US 2024/0281377 A1 Aug. 22, 2024

Related U.S. Application Data

(60) Provisional application No. 63/447,264, filed on Feb.
21, 2023.

(51) Int. Cl.
| | |
|---|---|
| *G06F 12/08* | (2016.01) |
| *G06F 9/30* | (2018.01) |
| *G06F 12/0811* | (2016.01) |
| *G06F 12/084* | (2016.01) |
| *G06F 12/1045* | (2016.01) |

(52) U.S. Cl.
CPC ...... *G06F 12/0811* (2013.01); *G06F 9/30047*
(2013.01); *G06F 12/084* (2013.01); *G06F*
*12/1045* (2013.01)

(58) Field of Classification Search
CPC .......................... G06F 12/0811; G06F 9/30047
See application file for complete search history.

(56) References Cited

U.S. PATENT DOCUMENTS

| | | | |
|---|---|---|---|
| 6,886,092 B1 | 4/2005 | Douglass et al. | |
| 11,422,812 B2 | 8/2022 | Kegel | |
| 11,886,854 B1 | 1/2024 | Maidee | |
| 2003/0005237 A1* | 1/2003 | Dhong | G06F 12/084 |
| | | | 711/146 |
| 2013/0031562 A1* | 1/2013 | Gusak | G06F 9/505 |
| | | | 718/105 |

(Continued)

FOREIGN PATENT DOCUMENTS

| | | |
|---|---|---|
| CN | 115328820 B | 12/2022 |

OTHER PUBLICATIONS

RyzenTM AI, AMD Extends its Leadership with the Introduction of
its Broadest Portfolio of High-Performance PC Products for Mobile
and Desktop, Jan. 2023, https://www.amd.com/en/newsroom/press-
releases/2023-1-4-amd-extends-its-leadership-with-the-introduction-
o.html.

(Continued)

*Primary Examiner* — Jae U Yu
(74) *Attorney, Agent, or Firm* — Patterson + Sheridan,
LLP

(57) ABSTRACT

Embodiments herein describe a configurable engine that is
embedded into the cache hierarchy of a processor. The
configurable engine can enable efficient data sharing
between the main memory, cache memories, and the core.
The configurable engine can perform operations that are
more efficient to be done in the cache hierarchy. In one
embodiment, the configurable engine is controlled (or con-
figured) by software (e.g., the operating system (OS)),
adapting to each application domain. That is, the OS can
configure the engine according to a data flow profile of a
particular application being executed by the processor.

20 Claims, 9 Drawing Sheets

(56) References Cited

U.S. PATENT DOCUMENTS

2022/0197808 A1    6/2022  Alam et al.
2022/0382550 A1    12/2022  Kegel

OTHER PUBLICATIONS

Acceleration for Dynamic Workloads, https://www.xilinx.com/products/boards-and-kits/alveo.html.
Ainsworth, S., et al. "An Event-Triggered Programmable Prefetcher for Irregular Workloads", The International Conference on Architectural Support for Programming Languages and Operating Systems (ASPLOS), 2018.
Lockerman, E., et al. "Livia: Data-Centric Computing Throughout the Memory Hierarchy", The International Conference on Architectural Support for Programming Languages and Operating Systems (ASPLOS), 2020.
Schwedock, B., et al. "tako: A Polymorphic Cache Hierarchy for General-Purpose Optimization of Data Movement", The International Symposium on Computer Architecture (ISCA), 2022.
International Search Report and Written Opinion for PCT/US2024/016281 filed May 22, 2024.
Tsai, Po-An, et al., "Jenga: Software-Defined Cache Hierarchies", Proceedings of the 44th Annual International Symposium on Computer Archiecture, New York, NY, 2017 (14 pages).

* cited by examiner

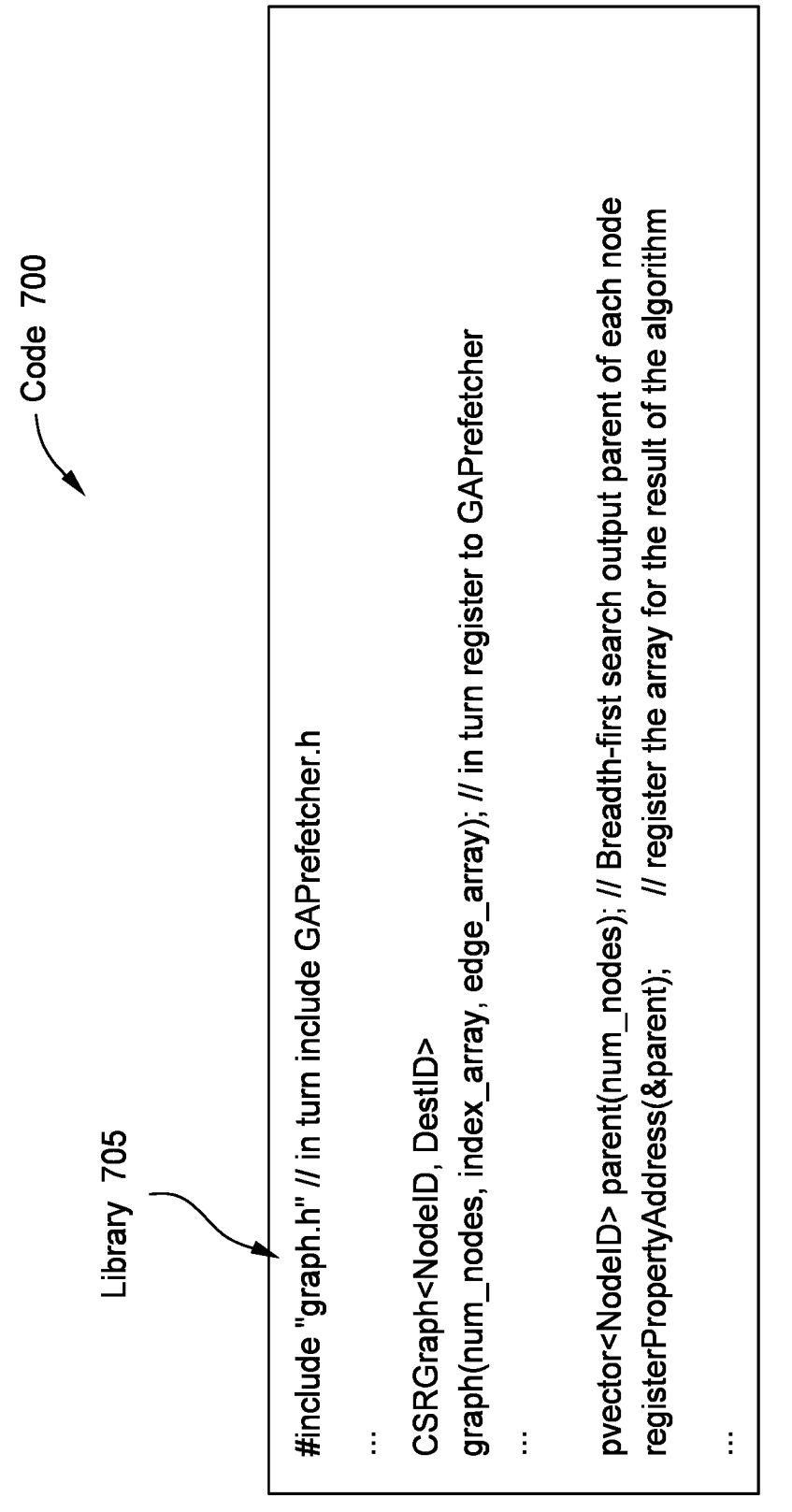

Code 700

Library 705

① #include "graph.h" // in turn include GAPrefetcher.h

⋮

CSRGraph<NodeID, DestID>
graph(num_nodes, index_array, edge_array); // in turn register to GAPrefetcher

⋮

② pvector<NodeID> parent(num_nodes); // Breadth-first search output parent of each node
registerPropertyAddress(&parent);    // register the array for the result of the algorithm

⋮

③ g++ ... -lgaprefetcher

FIG. 7

EMBEDDED CONFIGURABLE ENGINE

TECHNICAL FIELD

Examples of the present disclosure generally relate to embedding a configurable engine into a processor to manage data flowing between caches, main memory, and cores in the processor.

BACKGROUND

Modern central processing units (CPUs) suffer significant inefficiencies from mis-predictions and data movement inefficiencies in the cache hierarchy. Applications with irregular workloads can generate irregular data flow patterns when storing and retrieving data from caches and main memory. These applications can execute faster if the processor provides an efficient, customized implementation for these irregular workloads. Current proposed solutions for these inefficiencies include placing a specialized execution engine in the main data path inside a core of the processor. This form of on-core integration provides the most fine-grain integration possible because the engine performs an operation in an analogous way to other execution units. However, this form of integration results in several undesirable challenges for practical implementation. First, the engine is inserted in an area that has a large effect on the core performance. As a result, the performance optimization of the core becomes more complex. Second, such integration does not allow executing some operations that would be more beneficial to perform closer to the memory. Further, CPU cores run at very high frequencies, which has a wide gap with typical performance of field programmable gate arrays (FPGAs) and other data flow engines which may be inserted into the core.

As an example, an instruction dispatcher is typically responsible for scheduling the operations on the engine in addition to those of other execution units. It must keep track of instruction dependency through register renaming among other complex tasks. As a result, the dispatcher becomes more complicated with on-core integration of the execution engine.

Specialized instructions (mapped to operations on the engine) can be delivered to the dispatcher in the same manner as other instructions. Because a small number of operands is allowed, the set of operations on the execution engine is limited. Some instruction set architecture (ISA) extensions are provided for single instruction, multiple data (SIMD) operations. However, an ISA extension complicates the core design and can degrade core performance. Backward compatibility concern is another barrier for ISA extension. Therefore, ISA extension is not viable for many applications, especially those with irregular workloads.

SUMMARY

Techniques for a processor are described. One example is a processor that includes a first core comprising a first private cache in a first level of a cache hierarchy, a second core comprising a second private cache in the first level of the cache hierarchy, a shared cache in a second level of the cache hierarchy, the shared cache comprising a configurable engine, the configurable engine comprising circuitry configured to manage data transferred between the first and second private caches and the shared cache. Moreover, the configurable engine is reconfigurable, by software, to perform tasks for different user applications executing on the first and second cores.

Another embodiment described herein is a method that includes providing a configurable engine in a shared cache of a processor, wherein the processor comprises multiple cores with private caches, wherein the configurable engine comprises circuitry that manages data transferred between the private caches and the shared cache, receiving a library or framework for the configurable engine, providing runtime information from a user application to the configurable engine using the library or framework, and linking the library or framework to the user application.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 7 is software code for configuring an embedded configurable engine for use by a user application, according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
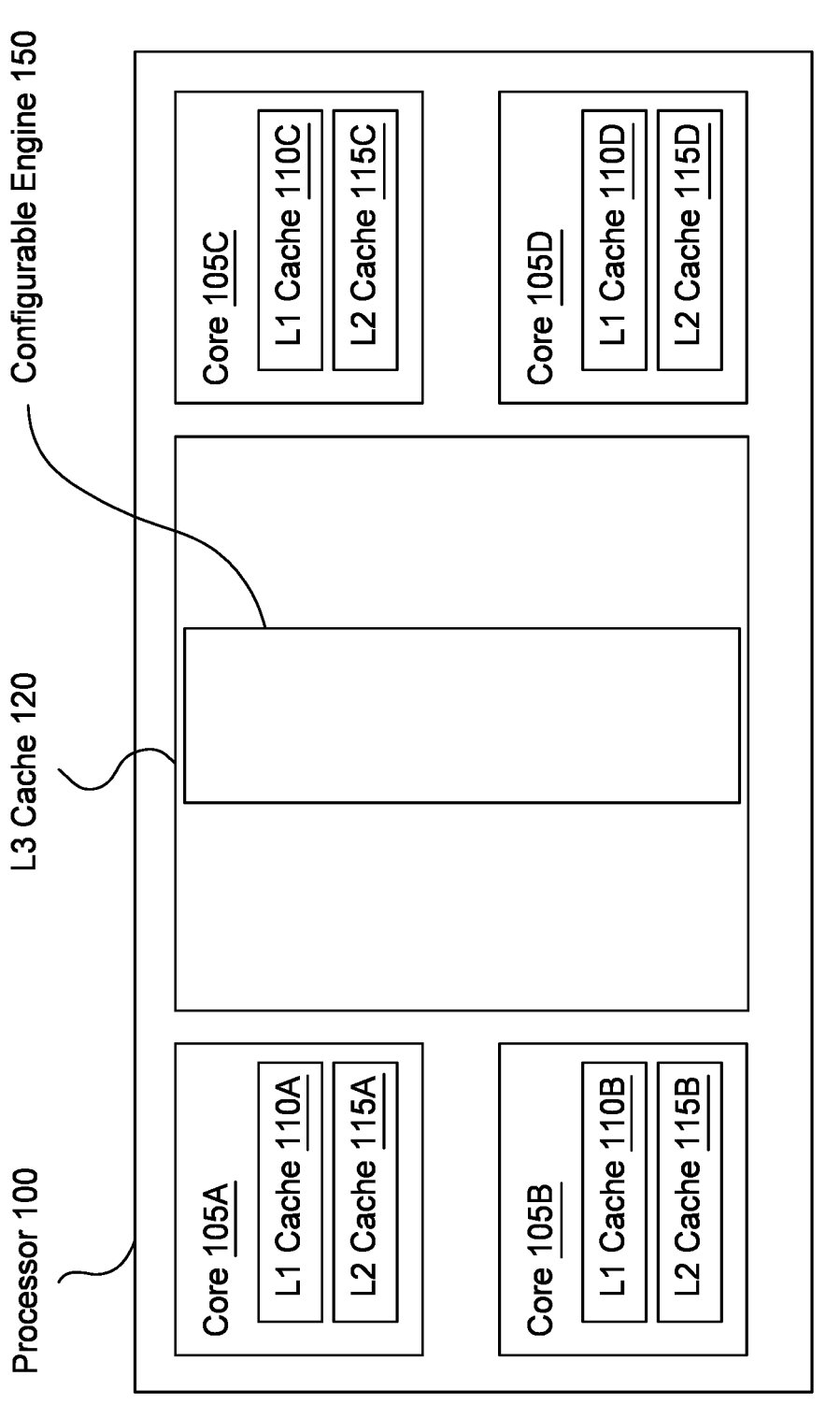
FIG. 1 illustrates an embedded configurable engine in a cache hierarchy of a processor, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe an embedded configurable engine that can address the CPU inefficiencies discussed above without requiring the complexity of an ISA extension. In one embodiment, the configurable engine is embedded into the cache hierarchy of a processor, rather than into the cores of the processor. Nonetheless, the configurable engine can enable efficient data sharing between the main memory, cache memories, and the core. Further, the engine can be a data flow engine that is configurable, enabling customization for a variety of target domains with the same or similar architecture. This is especially useful for applications with irregular workloads.

In one embodiment, the configurable engine is controlled (or configured) by software, such as an operating system (OS), adapting to each application domain. That is, software can configure the engine according to a data flow profile of a particular application being executed by the processor. Further, the software can dynamically reconfigure the configurable engine through a firmware update with minimal disruption to existing flows.

FIG. 1 illustrates an embedded configurable engine 150 in a cache hierarchy of a processor 100, according to an example. The processor 100 can be an integrated circuit (or chip) that includes multiple cores 105. While FIG. 1 illustrates four cores 105A-D, the processor 100 can include any number of cores.

In this example, each core 105 includes an L1 cache 110 and an L2 cache 115. In one embodiment, these caches 110, 115 are private (or unshared) caches which are not accessible by other cores 105 in the processor 100. In contrast, the processor also includes an L3 cache 120 which is shared by the cores 105. That is, any of the cores 105 can store and read data from the L3 cache 120.

In this example, the configurable engine 150 is physically disposed in a portion of the processor 100 that includes the L3 cache 120. In one embodiment, the configurable engine 150 facilitates communication between the L3 cache 120 (and the main memory, which is not shown) and the L2 caches 115A-D in the cores 105A-D. For example, the engine 150 can be used along with a prefetcher implemented in the engine 150 to retrieve data from the L3 cache 120 (or main memory) and store that data in the L2 or L1 caches 115, 110 in the cores 105. For example, each core 105 may include a respective prefetcher.

In traditional prefetcher models, the prefetcher learns and predicts data request patterns. However, in a domain specific model, the prefetchers knows data layout and usage. For example, in a software influenced paradigm, data movement can be extracted from the domain specific model so that the prefetcher knows the data layout and usage without having to learn or predict patterns. The configurable engine 150 provides a way to use a domain specific prefetcher to prefetch data from the L3 cache 120 (or the main memory) and store the data in the L2 cache 115 for a particular core 105. However, prefetching is just one use of the configurable engine 150. For example, in another embodiment, the configurable engine 150 can be used as a data compression engine. In another example, the configurable engine 150 may observe the data being transferred between the L2 and L3 caches. For example, to detect a side-channel attack, the engine 150 can observe the state of different data as it is transferred between the caches. In another embodiment, the engine observes the transferred data and influences the program running on the core by modifying shared data. In another embodiment, the configurable engine 150 can be configured to perform common operation for the system.

In one embodiment, the configurable engine 150 includes programmable logic circuitry (e.g., look-up-tables, configurable logic blocks (CLBs), etc.). In one embodiment, the configurable engine 150 can be an FPGA or a coarse-grained reconfigurable architecture (CGRA) which is embedded into the integrated circuit of the processor 100. In another embodiment, the configurable engine 150 is formed using hardened circuitry, such as circuitry used to implement a data flow engine. In that case, the configurable engine 150 may be less flexible than when formed using an FPGA or CGRA, but can nonetheless be configurable to perform several different functions (e.g., prefetching or data compression) or enable several different data flow patterns. For example, the configurable engine 150 may be a data flow engine, an FPGA fabric, or a bus-configured FPGA fabric.

While FIG. 1 illustrates embedding the configurable engine 150 in the L3 cache 120, this is just one example. In one embodiment, the configurable engine 150 can be embedded in any shared or unshared cache level. For example, the processor 100 may have a L4 shared cache, in which case, the configurable engine 150 can be embedded in that cache. In one embodiment, the configurable engine 150 is embedded in the highest cache memory that is directly below the main memory (e.g., RAM) in the cache hierarchy.

Figure 2A:
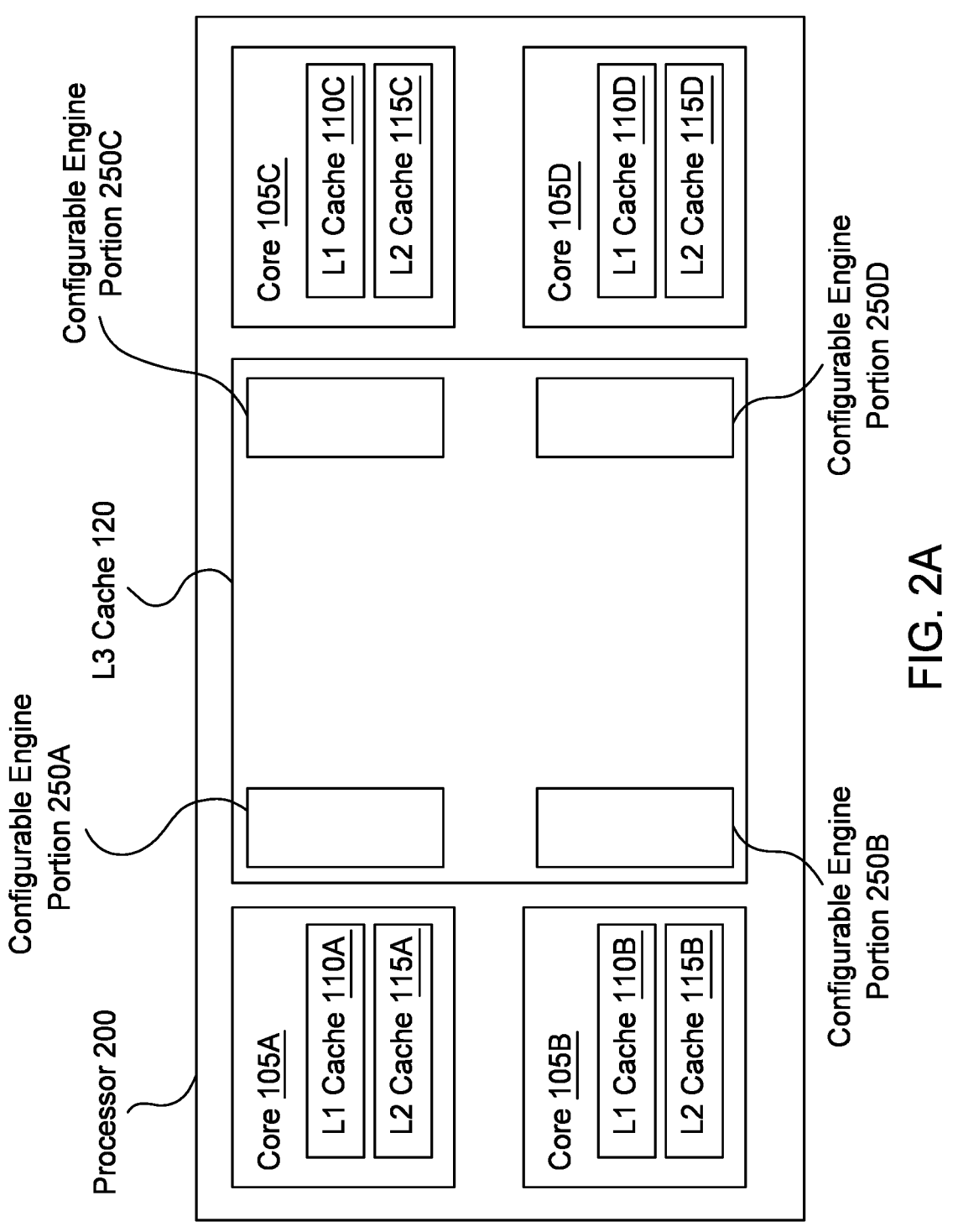
FIGS. 2A and 2B each illustrate a distributed embedded configurable engine in a cache hierarchy of a processor, according to an example.

FIG. 2A illustrates a distributed embedded configurable engine 150 in a cache hierarchy of a processor 200, according to an example. Like the processor 100 in FIG. 1, the processor 200 is an integrated circuit (or chip) that includes multiple cores 105. While FIG. 2A illustrates four cores 105A-D, the processor 200 can include any number of cores. The cores 105 in FIG. 2A also include private L1 and L2 caches 110 and 115 as shown in FIG. 1.

However, instead of the configurable engine being located in a contiguous portion of the L3 cache 120, in this example, the configurable engine is distributed throughout the L3 cache 120. As shown, the configurable engine is divided into four configurable engine portions 250A-D which are disposed in the L3 cache 120 proximate to the four cores 105A-D. That is, the configurable engine portion 250A is disposed in the L3 cache 120 at an area proximate to the core 105A, the configurable engine portion 250B is disposed in the L3 cache 120 at an area proximate to the core 105B, the configurable engine portion 250C is disposed in the L3 cache 120 at an area proximate to the core 105C, and the configurable engine portion 250D is disposed in the L3 cache 120 at an area proximate to the core 105D. These separate portions 250 can be considered as one, distributed configurable engine or as multiple, separate configurable engines.

In some implementations, there may be performance benefits to having the circuitry of the configurable engine being disposed in a contiguous location in the L3 cache 120, as shown in FIG. 1. However, in other implementations, there may be performance benefits for distributing the circuitry in the configurable engine so that portions 250 are disposed closer to respective cores 105 as shown in FIG. 2A (i.e., the portions 250 are non-contiguous).

While FIG. 2A illustrates distributing the portions 250 of the configurable engine in the L3 cache 120, this is just one example. In one embodiment, the configurable engine 150 can be embedded and distributed in any shared cache level. In one embodiment, the configurable engine portions 250 are embedded and distributed in the highest cache memory that is directly below the main memory (e.g., RAM) in the cache hierarchy.

In another embodiment, both distributed and common configurable engines work cooperatively as shown in FIG.

2B. Each portion of a distributed configurable engine 250A-D observes memory accesses into and out of its associated core 105A-D, for some or all address ranges. Each portion of the distributed engine 250A-D can notify a common configurable engine 260 of the observed accesses or forward the access requests to the engine 260. The common configurable engine 260 uses the information according to the predefined operations for the current workload. The common configurable engine 260 can interface to the cache hierarchy through a cache 270. Although disposed outside of any core, the cache 270 behaves like an L2 cache of a core, e.g., caches 115A-D. Such arrangement allows integrating the engine using the existing cache coherency mechanism.

Figure 2B:
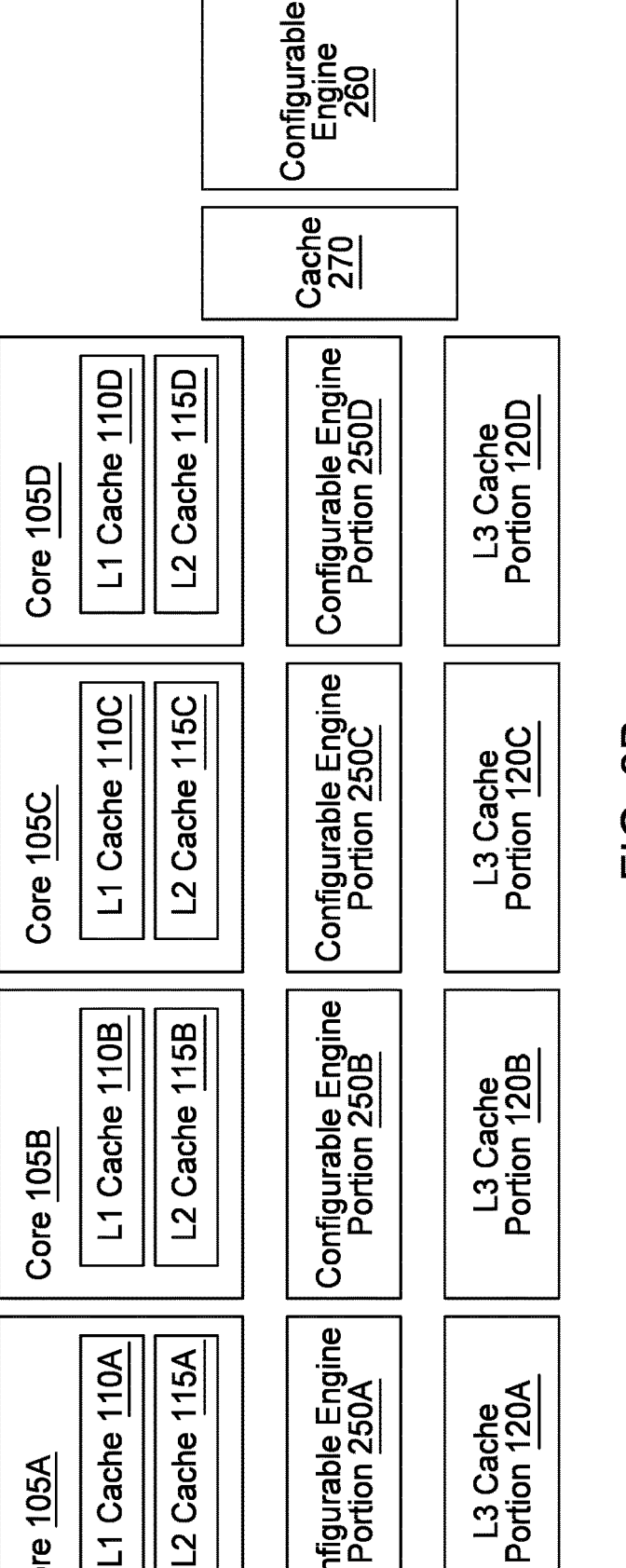
Figure 3:
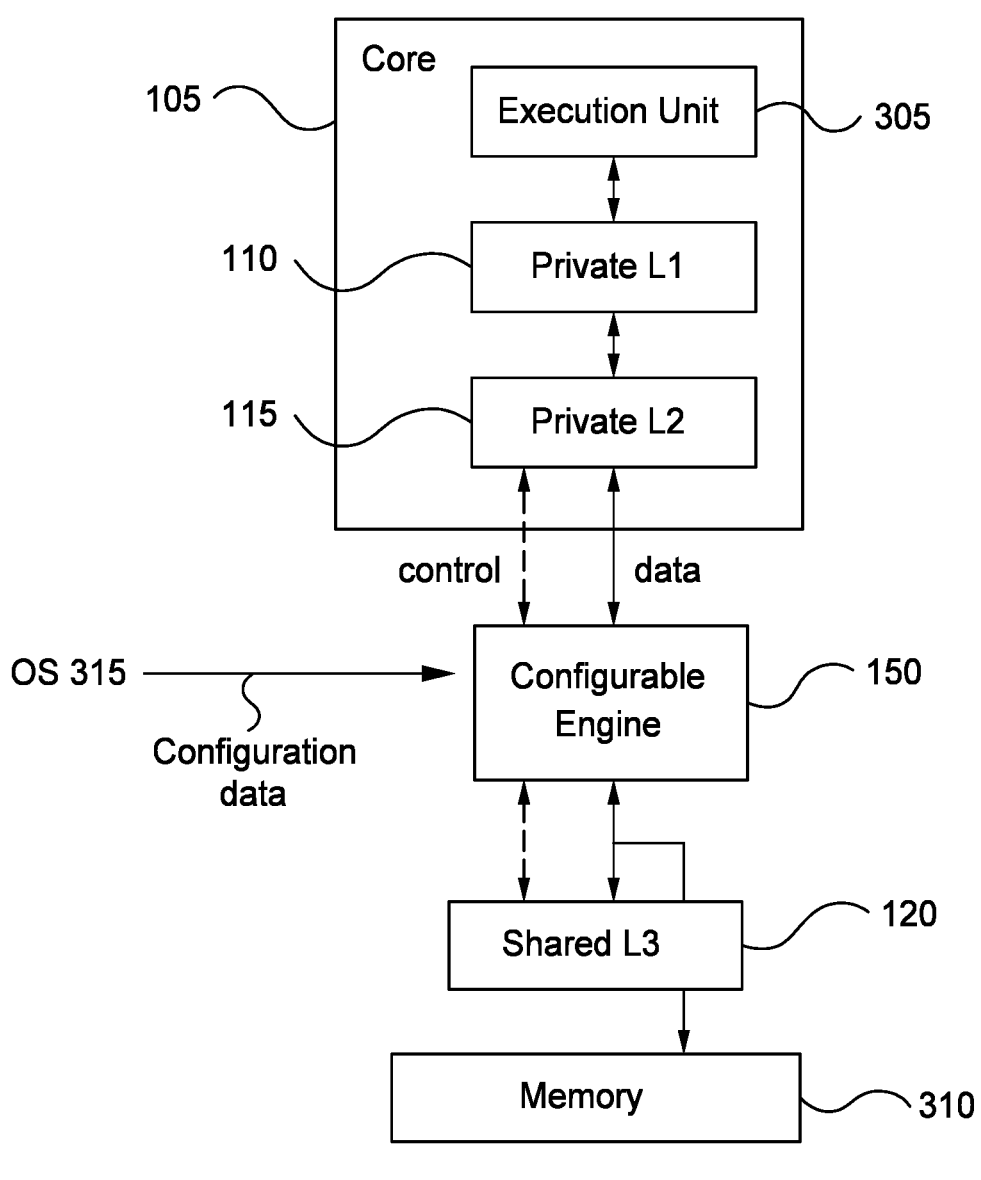
FIG. 3 is a logical view of an embedded configurable engine in a cache hierarchy, according to an example.

FIG. 3 is a logical view of an embedded configurable engine 150 in a cache hierarchy, according to an example. This logical view is the same if the configurable engine was disposed in a contiguous area of the L3 cache as shown in FIG. 1 or if the configure engine was distributed to different non-contiguous areas of the L3 cache as shown in FIG. 2A or 2B.

In FIG. 3, the core includes an execution unit 305 which transmits data to, and receives data from, the L1 cache 110 and the L2 cache 115. In this example, these caches 110, 115 are private caches that are accessible only to execution units in the core 105 (and not to other cores in the processor).

The configurable engine 150 is logically disposed between the L2 cache 115 and the L3 cache 120. That is, the configurable engine 150 manages the flow of data between the L2 cache 115 and the L3 cache 120. Further, FIG. 3 illustrates that the configurable engine 150 can exchange both control data and application data. The application data can include the data used by (and generated by) the execution unit 305 when executing a particular user application. The control data exchanged between the engine 150 and the L2 cache 115 allows the engine 150 to query the state of the cache 115 and to invalidate particular cache contents. The control data exchanged between the engine 150 and the L3 cache 120 can serve similar functions. Further, FIG. 3 illustrates the L3 cache 120 communicating with main memory 310 (e.g., RAM).

FIG. 3 also illustrates the configurable engine 150 receiving configuration data from the OS 315. The configuration data can configure (or program) the configurable engine to perform data flow tasks. In one embodiment, the OS 315 configures the engine 150 to perform a customized data flow tasks that correspond to a data flow pattern for a particular user application being executed by the execution unit 305. For example, the user application may have an irregular workload which corresponds to an irregular data flow pattern. Instead of asking a prefetcher in a core to attempt to learn this pattern, the OS 315 can configure the engine 150 to perform data flow tasks for this pattern. In this software centric example, since the OS 315 has knowledge of the irregular data flow pattern, it can configure the engine 150 to perform data flow tasks customized for the data flow pattern. Using the OS 315 to configure the configurable engine 150 is discussed in more detail in FIG. 5 below. While the embodiments herein discuss using the OS 315 to configure the engine 150, other types of software can be used to configure the engine 150 in a manner that is transparent to the user.

FIG. 3 illustrates an example where the engine 150 is between the private L2 cache 110 and the shared L3 cache 120. The engine 150 can observe the activity of the attached caches in a similar manner as a hardware prefetcher. For example, the engine 150 is aware of a memory access and whether the access results in a miss or a hit. The engine 150 can observe and perform many activities like a cache controller. For example, the engine 150 can see and update cache line flags, and determine whether a cache line is filled or evicted. Furthermore, the engine 150 can do the following operations on the connection between L2 and L3 caches: a) intercept, block, and/or insert accesses to the L3 cache, and b) intercept, block, and/or insert responses to L2 cache. These operations allow the configurable engine 150 to manage the data movement within the cache hierarchy in and out of the core 105. The engine can operate on the data and place the resulting data back into the cache hierarchy. The engine 150 may be configured to not interfere with some address ranges, oblivious to the memory accesses within those ranges or of a particular application. In effect, the engine 150 can interact with a task executing on the core 105 at a fine level and can define the context for those tasks. Notably, this capability is beyond that of a hardware prefetcher or a typical L1/L2 cache controller.

Figure 4:
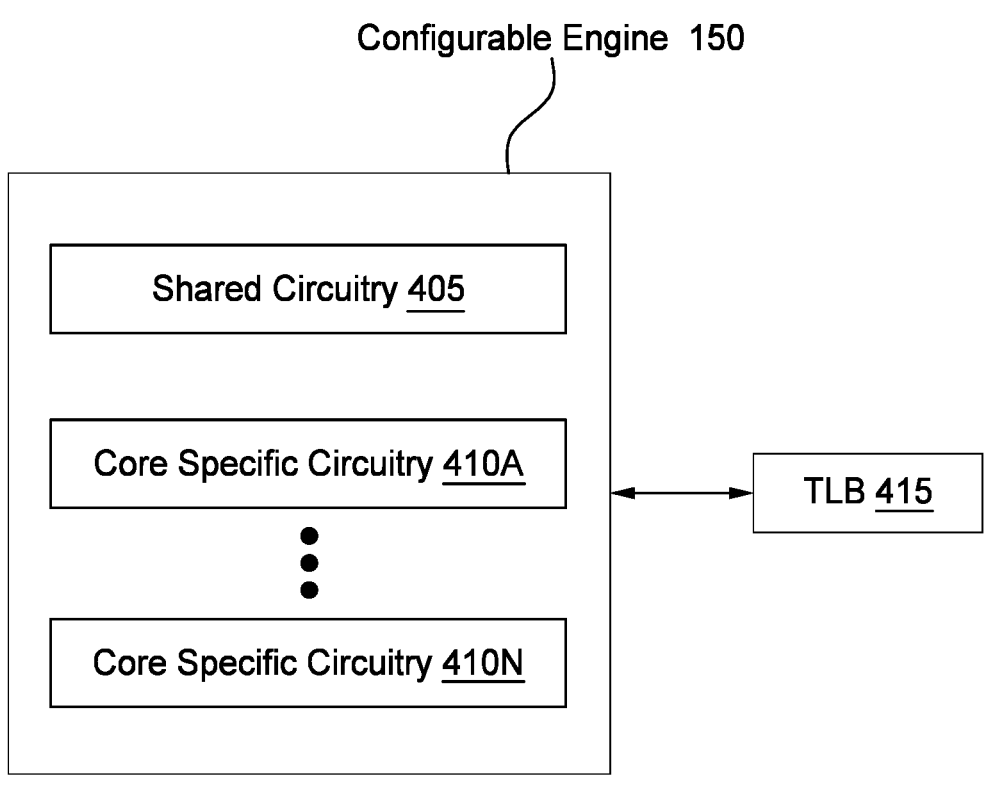
FIG. 4 illustrates an embedded configurable engine, according to an example.

FIG. 4 illustrates an embedded configurable engine 150, according to an example. The engine 150 includes two kinds of components: a common component (e.g., shared circuitry 405) and a per-core component (e.g., core specific circuitry 410). The shared circuitry 405 is shared among the cores in the processor and the other components associated with each core. Within one integrated circuit or die, there can be multiple engines 150. The engines on different dies can cooperate, e.g., as the OS migrate a thread from one die to another. The shared circuitry 405 can implement multiple engines and they can be allocated to the core that uses them. In addition, the shared circuitry 405 allows tracking activity across multiple cores.

The per-core component (e.g., core specific circuitry 410) may provide services that are latency critical and implement an configurable engine dedicated for the attached core. For example, the core specific circuitry 410A may be dedicated to one core while the core specific circuitry 410N is dedicate to another core. Even though the configurable engine is shown in FIG. 4 as a contiguous area (e.g., like shown in FIG. 1) which includes the shared circuitry 405 and the core specific circuitry 410, this functionality can distributed physically in multiple portions (or separate engines) across the cache hierarchy (e.g., as shown in FIGS. 2A and 2B).

In one embodiment, the engines have access to a Table Look-aside Buffer (TLB) 415 to map (or perform address translation) from a virtual address to a physical address and a reversed TLB to map from physical to virtual addresses. These mappings are advantageous because the operation may contain virtual addresses, but memory access at L2 or L3 cache uses physical addresses. Therefore, the input and output of the engine 150 can be either physical or virtual addresses.

Alternatively, two sets of content addressable memories (CAMs) that are managed directly by the OS can be used for address translation. This has an advantage in that there is no need to change the address lookup mechanism of the processor to account for the new buffers. Additionally, it may be beneficial to allow the engine 150 to access the memory for the intermediate data of the task. In one embodiment, the engine 150 can read from memory and write intermediate data into an internal scratchpad memory.

Figure 5:
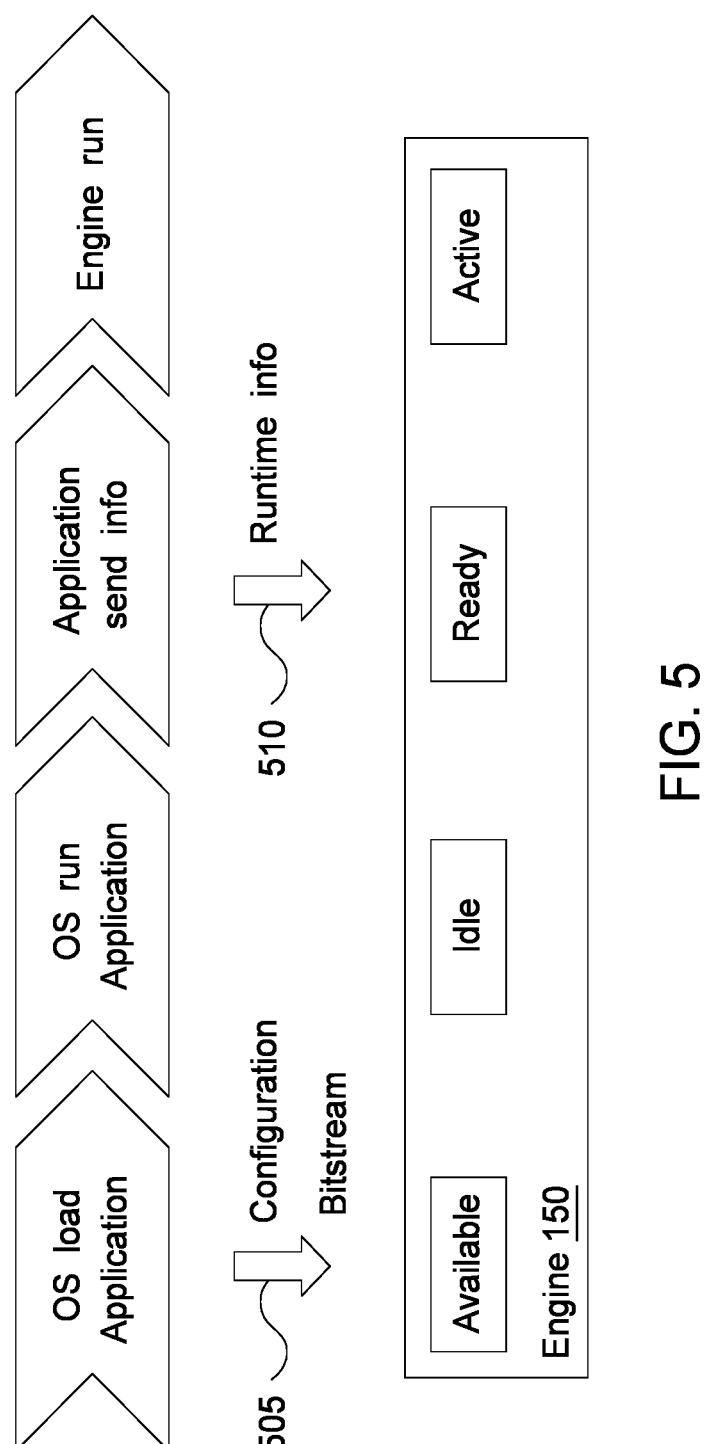
FIG. 5 is a work flow for configuring an embedded configurable engine, according to an example.

FIG. 5 is a work flow for configuring an embedded configurable engine, according to an example. In one embodiment, an instruction scheduler within each core can be responsible to schedule tasks to run on an engine in the core. However, since the configurable engine discussed above may be embedded in the cache hierarchy, scheduling tasks for the engine can be performed differently.

In one embodiment, dispatching tasks to the configurable engine in a cache hierarchy is done in two steps. First, the OS (or other type of software) initializes the task on the configurable engine based on the information from the application. Second, the target activities of the attached cache trigger the task to preform predefined operations. In one embodiment, there are two types of activities. One is about the memory access that flow through the engine from either L2 or L3 cache. The access can be of different kinds and the engine can be programmed to act upon them based on its kind (e.g., prefetch access, write-through, write-back, table walk access) or its target address—i.e., perform different actions depending on which range the address belongs. The other type of activity is about activity the engine 150 observed through the control channel by exchanging control data. For example, if there is a cache miss/hit/fill at L2/L3 on a particular address range (configured through OS).

The high-level interaction between the configurable engine and OS is shown in FIG. 5. When the OS loads a binary of an application that uses the configurable engine, the OS also configures the configurable engine using a bitstream as shown by arrow 505. In one embodiment, the OS first checks whether there is enough room in the configurable engine to implement the task before configuring the engine. The application can instruct the OS to wait until an engine become available or to execute without using the engine. The configurable engine may wait for runtime information from the application and for the task to become active. That is, the configurable engine may be in an idle state after it is configured, waiting for runtime information and for the task to be activated.

As shown by arrow 510, the application provides the runtime information to the engine 150 which places the engine 150 in a ready state. In one embodiment, the application initiates the flow of the runtime information to the engine 150, but the OS is responsible to relay the runtime information to the engine 150. For example, the application may not be able to interact with the engine directly.

In one embodiment, the engine may receive multiple information throughout the duration of the application. For example, application may contain several stages. Thus, the optimal prefetching strategy can depend on these phases. For example, early on, the graph application may process fanout nodes, but later processes fanin nodes. The two phases may cause the configurable engine to watch different address ranges. In this case, the application will need to at least tell the engine to switch its behavior. In some cases, the task can be active without such information.

Once the task is activated (e.g., the configuration engine 150 is placed in the active state), the engine 150 monitors and performs the tasks if predefined conditions are met. That is, the engine 150 manages the data being transferred between the caches, which can include observing the data, moving the data, compressing the data, processing the data, or operating on the data.

The trigger conditions can depend on additional bits, that the OS set based on behavior of the application and propagates through page table entries onto metadata of each memory access. A bit value associates directly with an operation, or a class of operations to be selected by the engine based on other runtime conditions of the system. The conditions can also include a set of addresses ranges, associated with operations, sent to the engine through other means.

Using the workflow in FIG. 5, the OS can allocate, schedule, and load tasks in the engine 150. Further, the OS can repeat FIG. 5 to configure the engine 150 to perform tasks for a first user application (being executed by the cores) during a first time period but then reconfigure the engine 150 to perform tasks for a second user application during a second time period. The engine can perform several tasks for different applications concurrently.

Moreover, the OS can perform load balancing on the engine 150 and the core to provide better overall system performance. For example, if there is no room in the engine and the priority of a new application is low, the OS can choose to use an engine in the core rather than the configurable engine 150 in the shared cache. In that case, the OS would not configure the engine 150 to perform the tasks. However, if the priority of the new application is high, the OS can replace the current implementation of the engine 150 that performs tasks for an application with a lower priority with a new implementation of the engine 150 (using the workflow in FIG. 5) to perform tasks for the new, higher priority application.

Figure 6:
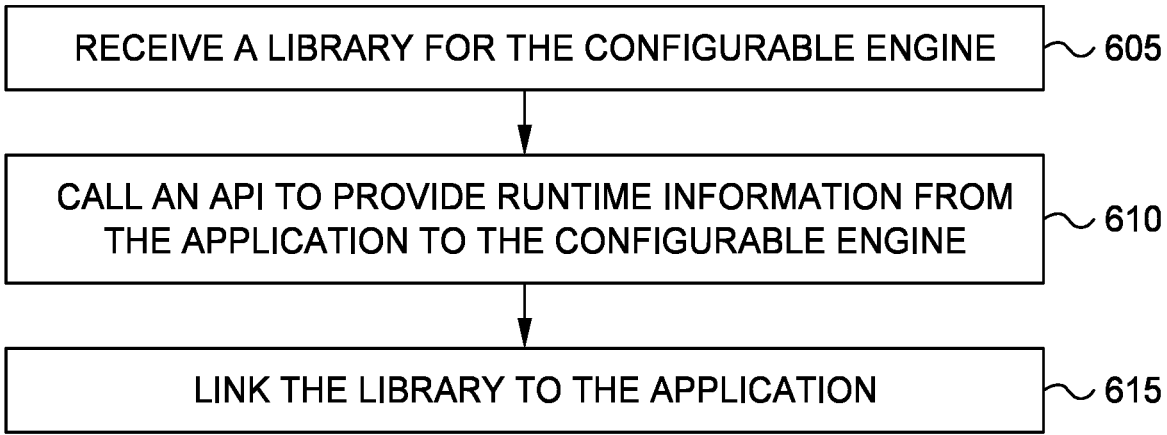
FIG. 6 is flowchart for configuring an embedded configurable engine for use by a user application, according to an example.

FIG. 6 is a flowchart for configuring an embedded configurable engine for use by a user application, according to one embodiment. In one embodiment, a software programmer is aware of the capability of the configurable engine and provides an implementation of the operations that would benefit the application along with a regular software implementation. The implementation can be obtained from a catalog or specially built for the application.

At block 605, a software developer receives or creates a library for the application that will use the configurable engine. An application may contain different phases that use different sets of operations. It is possible that there is not enough room in the engine to operate the requested operation. In that case, the OS can fall back to an implementation on the core. Alternatively, if compiled applications use some functionality from dynamically linked libraries. Those libraries can augment other implementations on the engine. Once the updated library is installed on a system with a configurable engine, the application can be serviced by the engine without recompilation. This is possible because of the dynamic linking nature.

At block 610, an application calls an application programming interface (API) to communicate runtime information to the configurable engine. This is shown below by the label "2" in FIG. 7 below. In one embodiment, the library provides the API to further configure the engine to perform different operations while the application is running. Generally, the library permits the user application to interact with the configurable engine using, e.g., one or more APIs.

In one embodiment, instead of receiving a library, the application may use a framework to communicate the runtime information to the configurable engine. In that case, the application may not have to use an API to communicate with the configurable engine.

At block 615, a compiler links the library to the application. In one embodiment, multiple applications (e.g., different user applications) in a domain are linked to a shared library. In one embodiment, the library encapsulates the mechanism to communicate to the configurable engine (e.g., which can serve the role as a prefetcher) through an OS kernel using a model-specific register (MSR) or some other methods.

FIG. 7 illustrates software code 700 for using a library 705 to enable interaction with a configurable engine embedded in a cache hierarchy. FIG. 7 illustrates an application that is written to use a domain specific prefetcher for graph analytics domain. The application includes the library header, calls specific APIs (e.g., block 610 of FIG. 6) and links to the library (block 615 of FIG. 6). The library header is labeled as "1" in FIG. 7, calling the APIs is labeled as "2" in the FIG. 7, and instructing the compiler to link to the library is labeled as "3" in FIG. 7.

Figure 8:
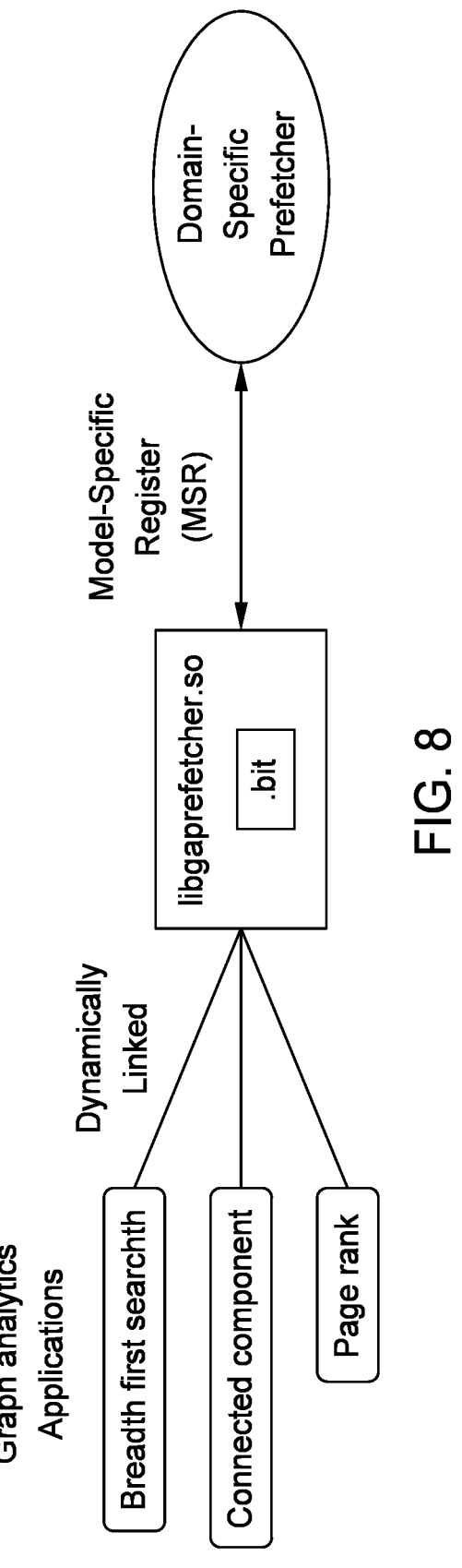
FIG. 8 illustrates a scenario where several applications use a shared library to communicate to an embedded configurable engine, according to an example.

FIG. 8 illustrates a scenario where several applications (e.g., different user applications) of the graph analytics domain can use a shared library to communicate to an embedded configurable engine. The library encapsulates an OS kernel component that has privilege to control and monitor the engine through one or more MSRs. Other modes of communications can use Control Registers (CR), shared addresses, or configuration bits. Libraries from various domains can use the common component (e.g., the shared circuitry 405 in FIG. 4) to interact with the engine.

The configurable engine discussed above can implement generic operations that benefit most applications, such as hardware prefetchers or data compressions. In such a case, the configuration of the engine can be done by a firmware at system boot, even before the OS becomes online. An updated version of the operations can be delivered through a firmware update. The firmware of systems with the same configurable engine can be different. The system operator can update the firmware that is suitable for the current use case. For example, a system used mostly as a search engine can use one firmware version for the configurable engine, while another used as a database system can use another firmware version for its configurable engine.

The embodiments herein allow acceleration of tasks tightly coupled to those in the core because they share the same data pathway, i.e., the cache hierarchy. On the other hand, the embodiments herein may not disrupt already challenging core design. Different devices using the same core design to target different use cases can include different variations of a configurable engine without changing the core itself. When an engine is disposed in the core itself, the engine is initiated and controlled through special instructions of an ISA. Thus, the benefit of such an engine is limited to operations compatible with the ISA limitation, i.e., the maximum number of operands. In contrast, an application can interact with a configurable engine embedded in a cache hierarchy through OS and libraries. Thus, any application could benefit by providing a suitable operation without affecting other applications the way changing the ISA would. As a result, the embodiments herein describe easy to implement techniques to provide vendor-specific differentiating features. A domain-specific framework can be used to further simplify the user interaction. Such framework encapsulates the interaction with the engine in such a way that users may not have to employ APIs directly.

In addition, the embodiments herein may permit running tasks closer to the memory to reduce latency and/or energy. The engine can observe and operate on data without (or before) propagating the data all the way to the core. As an example, this latency advantage enables the engine to implement a prefetcher for graph analytics domain that improve the performance of the application by up to 6%. Further, almost half of a core's pipeline cycles are stalled due to data and instruction fetches. With the embodiments herein, the amount of instruction and data fetched into the core can be reduced, which means the embodiments herein not only allow efficient implementation of larger operations compared to the existing solutions, but also help improve the overall system performance.

Some systems dispose configurable engines away from the core over NoC-like interconnect, either on-chip or off-chip. As such, the latency between the engine and the core is high. In addition, frequent communication between the engine and the core uses memory bandwidth and reduces the overall system performance. As a result, such integration can only offer acceleration to tasks where there is little communication to the core. A known use case is for tasks where the core configures the engine of the operation and locations of input and output. The input or output of the engine might connect to input/output (IO) circuitry directly. The core is notified when the operation finishes. These embodiments herein propose methods and system structures that allow acceleration of tasks that are more tightly coupled to the core. In particular, the structure allows doing so without negatively impacting the core design. This enables taking advantage of the locality that a cache hierarchy provides and yet operating near main memory per domain requirements. The impact will be addressing data movement inefficiencies outside the existing Load/Store paradigm.

Some other solutions include a programmable prefetcher unit (PPU) for speeding up applications with irregular workloads. However, the PPU cannot control and set the context for tasks running on the core. The PPU can only help bringing data earlier. In contrast, using the embodiments herein, the OS can store read-only data into the engine. When the core makes a read access to the data, the engine can provide the data and block the access from propagation, saving memory bandwidth. However, the PPU will need to bring the data in. Furthermore, the PPU is located inside the core itself, rather than being in a shared cache memory. Further still, PPU is off instruction fetch path, and thus, cannot operate on instruction streams. Moreover, the PPU uses a traditional processor architecture, while embodiments herein propose a data flow engine, which may be more power efficient for the Read-Modify-Write operations of the typical workloads.

Some other solutions employ engines for memory service programming model where the purpose of the system is to move compute closer to data. Thus, the engines are small and distributed, making implementation less practical due to additional configurability overhead. In contrast, the embodiments herein may employ larger engines, addressing data movement inefficiencies of the core by configuring the engine targeting the domain running on the core. In addition, the methods of using the configurable engine are different from engines for a memory service programming model.

Some other solutions use a general-purpose engine to offer optimizations of data movement. These general-purpose engines use callback to allow software to modify the cache behavior where the callbacks are short tasks created and scheduled entirely by a hardware in the engine. In contrast, the engine herein can use the OS to allocate, schedule, and load tasks. Therefore, the OS can perform load balancing on the engine in addition to the core to provide better overall system performance. For example, if there is no room in the engine and the priority of the new application is low, the OS can choose an implementation of the task that run on the core rather than the configurable engine in the shared cache. However, if the priority is high, the OS can replace the engine's implementation of a running application with a lower priority with its corresponding core's implementation to make room for the new application. Furthermore, the general-purpose engine may rely on phantom addresses (virtual address that will never map to physical addresses and only live in the cache) to trigger the engine. Instead, in one embodiment, the configurable engine discussed herein may use hardware-only solution to not rely on phantom addresses and avoid OS change to support them.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A processor, comprising:
a first core comprising a first private cache in a first level of a cache hierarchy;
a second core comprising a second private cache in the first level of the cache hierarchy;
a shared cache in a second level of the cache hierarchy, the shared cache comprising a configurable engine, the configurable engine comprising circuitry configured to manage data transferred between the first and second private caches and the shared cache,
wherein the configurable engine is reconfigurable, by software, to perform tasks for different user applications executing on the first and second cores.

2. The processor of claim 1, wherein the software is an operating system (OS) and reconfiguring the configurable engine using the OS comprises:
when the OS loads a binary of one of the different user applications, configuring the configurable engine using a bitstream provided by the OS.

3. The processor of claim 2, wherein reconfiguring the configurable engine using the OS comprises, after configuring the configurable engine:
maintaining the configurable engine in an idle state until receiving runtime information from the one of the different user applications;
providing the runtime information to the configurable engine to place the configurable engine in a ready state; and
activating the configurable engine so that the configurable engine performs the tasks when predefined conditions are met.

4. The processor of claim 1, wherein the configurable engine is configured to perform an intercept, a block, and insert access for at least one of (i) the first and second private caches or (ii) the shared cache.

5. The processor of claim 1, wherein the configurable engine is disposed in a contiguous portion of the shared cache.

6. The processor of claim 1, wherein the configurable engine comprises multiple portions that are distributed in non-contiguous areas in the shared cache, wherein a first portion of the portions is disposed proximate to the first core and a second portion of the portions is disposed proximate to the second core.

7. The processor of claim 6, wherein the configurable engine comprises a common configurable engine, wherein the multiple portions of the configurable engine notify the common configurable engine of accesses observed at respective cores or forward access requests to the common configurable engine.

8. The processor of claim 1, wherein the configurable engine is configured to access a memory to translate addresses between physical and virtual memory addresses when transmitting data between the first and second private caches and the shared cache.

9. The processor of claim 1, wherein the configurable engine is configured to read from a memory and write intermediate data into an internal scratchpad memory and write a final result to the memory.

10. The processor of claim 1, wherein the software is an operating system, wherein the operating system is configured to perform load balancing for the configurable engine based on a priority of the different user applications.

11. The processor of claim 1, wherein the configurable engine is one of: a data flow engine, an FPGA fabric, or a bus-configured FPGA fabric.

12. A method, comprising:
providing a configurable engine in a shared cache of a processor, wherein the processor comprises multiple cores with private caches, wherein the configurable engine comprises circuitry that manages data transferred between the private caches and the shared cache;
receiving a library or framework for the configurable engine;
providing runtime information from a user application to the configurable engine using the library or framework; and
linking the library or framework to the user application.

13. The method of claim 12, wherein the library permits the user application to interact with the configurable engine, the method further comprising:
calling an application programming interface (API) to provide the runtime information to the configurable engine, wherein the API is provided by the library.

14. The method of claim 12, further comprising:
linking the library to multiple applications, wherein the library permits the multiple applications to communicate to the configurable engine through an OS kernel.

15. The method of claim 12, further comprising:
prefetching data or performing data compression using the configurable engine on behalf of the user application.

16. The method of claim 12, wherein the configurable engine is disposed in a contiguous portion of the shared cache.

17. The method of claim 12, wherein the configurable engine comprises multiple portions that are distributed in non-contiguous areas in the shared cache, wherein a first portion of the portions is disposed proximate to a first core in the processor and a second portion of the portions is disposed proximate to a second core in the processor.

18. The method of claim 17, wherein the configurable engine comprises a common configurable engine, wherein the multiple portions of the configurable engine notify the common configurable engine of accesses observed at respective cores or forward access requests to the common configurable engine.

19. The method of claim 12, further comprising:
accessing, by the configurable engine, a memory to translate addresses between physical and virtual memory addresses when transmitting data between the private caches and the shared cache.

20. The method of claim 12, further comprising:
performing load balancing for the configurable engine based on a priority of different user applications.

*   *   *   *   *